(12) United States Patent
Beimert

(10) Patent No.: US 7,896,373 B2
(45) Date of Patent: Mar. 1, 2011

(54) LOCKING PIN LOCATING DEVICE

(76) Inventor: Duane Joseph Beimert, Blaine, MN (US)

( * ) Notice: Subject to any disclaimer, the term of this patent is extended or adjusted under 35 U.S.C. 154(b) by 0 days.

(21) Appl. No.: 12/592,070

(22) Filed: Nov. 18, 2009

(65) Prior Publication Data

US 2010/0147614 A1   Jun. 17, 2010

Related U.S. Application Data

(60) Provisional application No. 61/199,788, filed on Nov. 20, 2008.

(51) Int. Cl.
*B62D 33/08* (2006.01)
*B60G 5/00* (2006.01)

(52) U.S. Cl. .................. 280/149.2; 280/477; 180/209
(58) Field of Classification Search ............ 280/149.2, 280/423.1, 477; 180/209
See application file for complete search history.

(56) References Cited

U.S. PATENT DOCUMENTS

| | | | | |
|---|---|---|---|---|
| 4,687,220 A | * | 8/1987 | Danielson | 280/477 |
| 5,326,144 A | * | 7/1994 | Forcier | 294/19.1 |
| 5,531,467 A | * | 7/1996 | Schueman | 280/149.2 |
| 5,617,072 A | * | 4/1997 | McNeal | 340/431 |
| 5,678,834 A | * | 10/1997 | Wise | 280/149.2 |
| 6,199,503 B1 | * | 3/2001 | Midgett | 116/28 R |
| 6,322,091 B1 | * | 11/2001 | Lindley | 280/149.2 |
| 6,354,642 B1 | * | 3/2002 | Haggerty | 294/19.1 |
| 7,404,466 B2 | * | 7/2008 | Diehl | 180/209 |
| 2002/0125685 A1 | * | 9/2002 | White | 280/504 |
| 2004/0251659 A1 | * | 12/2004 | Amerson | 280/477 |
| 2005/0087955 A1 | * | 4/2005 | Kellogg | 280/477 |

* cited by examiner

*Primary Examiner* — Paul N. Dickson
*Assistant Examiner* — George D. Spisich
(74) *Attorney, Agent, or Firm* — Jacobson and Johnson; Thomas N. Phung

(57) ABSTRACT

A trailer-locking pin locating device comprising an elongated body having a first end, a second end, a crossbar located proximal the first end of the elongated body with the crossbar slidably supported by elongated body and positioned at an angle to the elongated body, a securing member connecting the elongated body to a portion of a semi-trailer, a signaling member comprising a rod having a first highly visible end and a second end, a resiliently flexible member connecting the second end of the rod to the elongated body with the highly visible end of the rod extending beyond the second end of the elongated body in a normal condition, a rod holder for supporting the signaling member in a loaded condition, and a trigger mechanism located on the elongated body with trigger mechanism displacing the signaling member from the loaded condition to the normal condition when triggered.

20 Claims, 6 Drawing Sheets

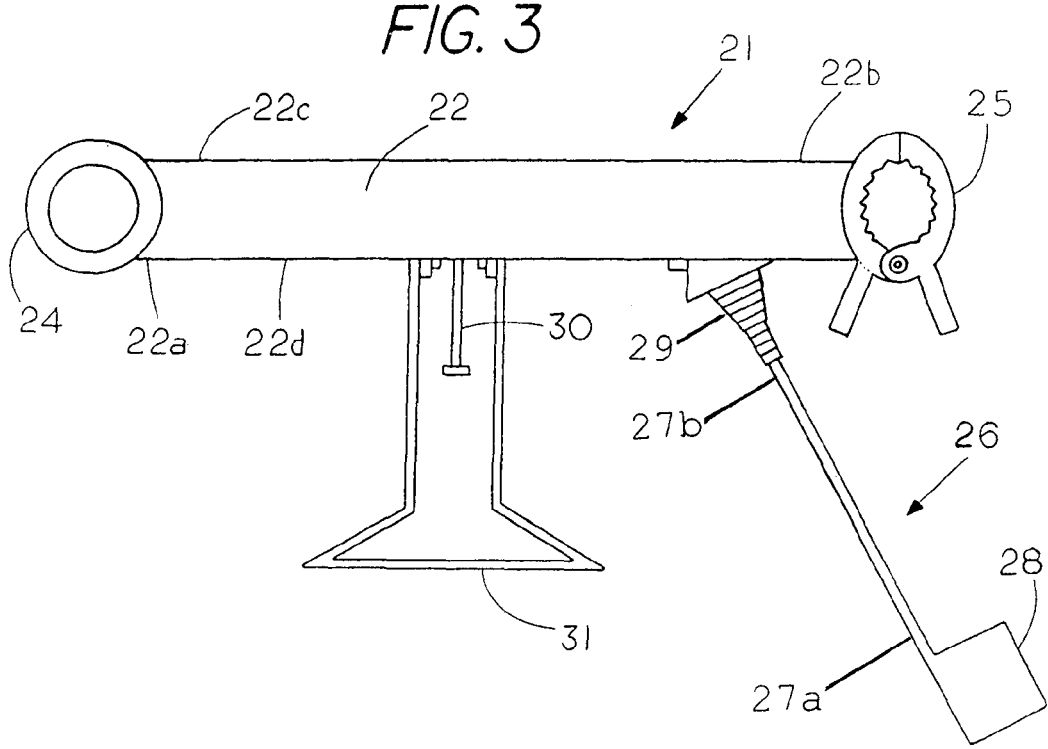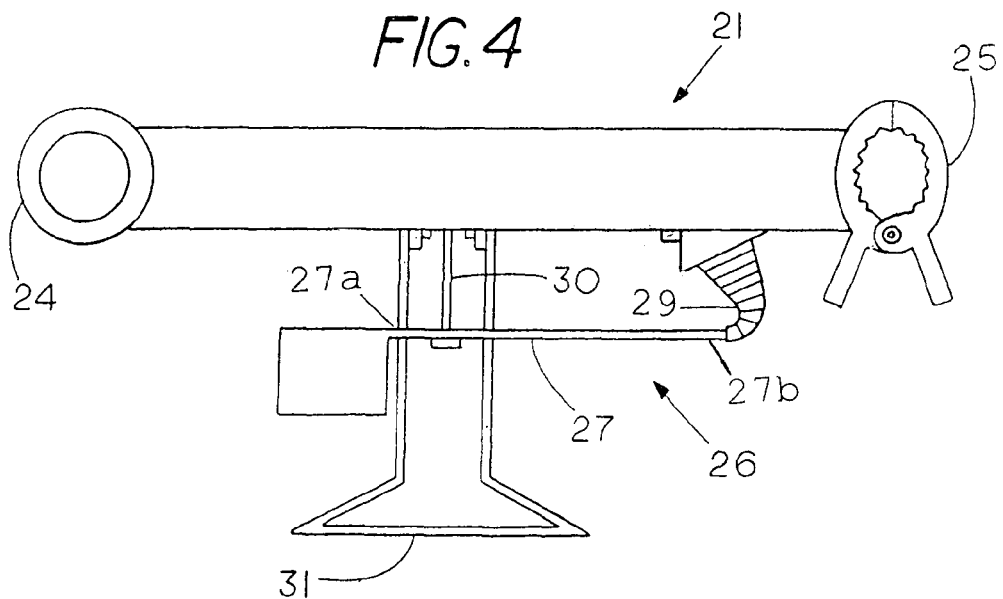

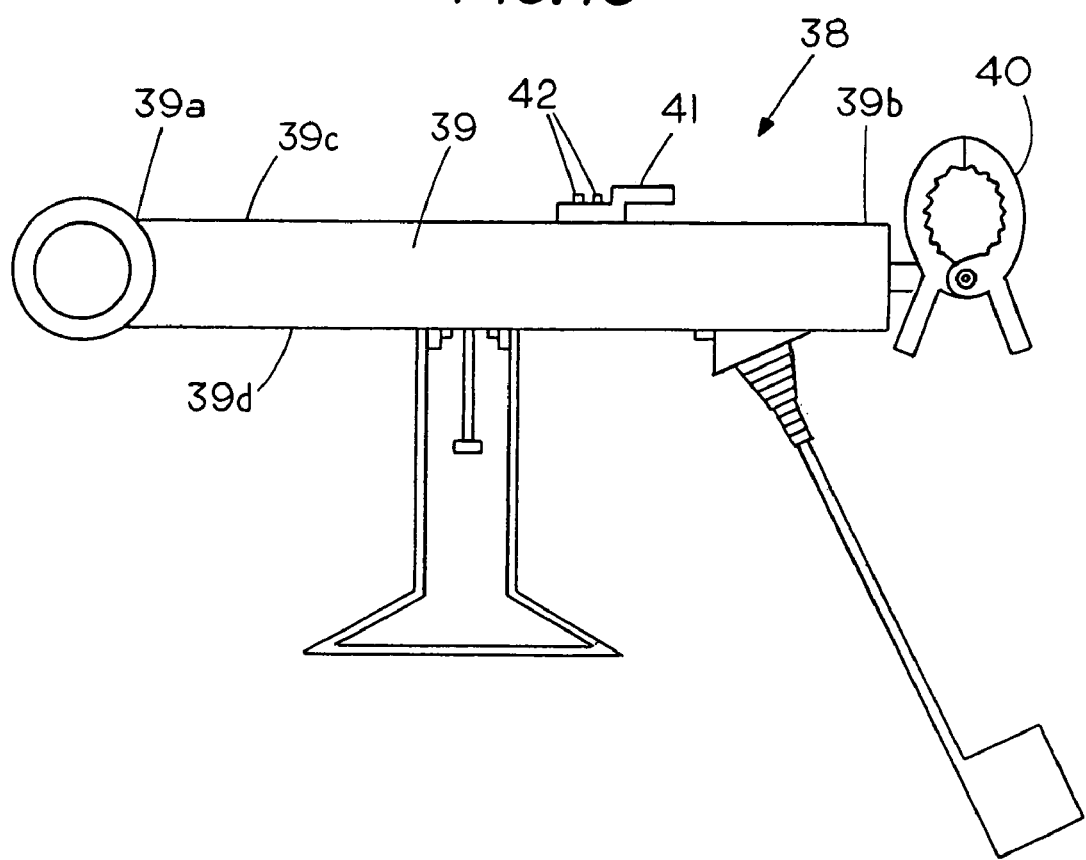

LOCKING PIN LOCATING DEVICE

CROSS REFERENCE TO RELATED APPLICATIONS

This application claims priority to currently pending U.S. Provisional Application Ser. No. 61/199,788; filed on Nov. 20, 2008; titled LOCKING PIN LOCATING DEVICE.

FIELD OF THE INVENTION

This invention relates generally to tools for use on semi-trucks and, more specifically to a locking pin locating device for use by the driver of a semi-trucks for locating a trailer of a semi-truck in the proper position over the tandem axle under the trailer to achieve the correct and legal weight distribution and balance relative to the different wheel locations of the trailer.

STATEMENT REGARDING FEDERALLY SPONSORED RESEARCH OR DEVELOPMENT

None

REFERENCE TO A MICROFICHE APPENDIX

None

BACKGROUND OF THE INVENTION

Semi-trucks generally comprise of a tractor and a trailer. For safety purposes federal and state regulations generally require that the loads carried in the trailers meet certain weight requirements. The weight requirements apply to the steers, the drives and the tandems of the trailer. It is well known in the art that the positioning of the trailer with respect to the tandems in the rear of the trailer affects the weight at all three locations on the trailer. As such semi-truck trailers are generally constructed to slide back and forth over the tandems of the trailer until the proper position is achieved and then locked into that position. The trailer comprises two parallel rails, fastened underneath the trailer and are fitted over corresponding rails on the tandems. The trailer rails include a series of pinholes positioned to engage extendable pins located on the tandems through holes in the tandem axle rails. Two or four pins systems are generally employed to lock the trailer and tandems together. In their use the pins are retracted to permit the trailer to slide back and forth over the tandems and are extended to lock the trailer to the tandems when the proper position is achieved. The mechanism used to extend and retract the pins is usually located on the tandems and controlled by a locking pin handle or lever wherein the displacement of the locking pin handle or lever simultaneously moves all of the pins.

The pin holes in the trailer rails are located so they can correspond to the locations of the pins such that lining up one of the holes on the trailer rail with a locking pin on one side of the tandems will simultaneously line up a hole on the trailer rail on the opposing side of the trailer with a locking pin on the other side of the tandems.

One of the main problems associated with positioning the trailer in the proper position over the tandems axle in the desired location is that the driver moving the tractor cannot see the relative position of the trailer with respect to the tandems at the back of the trailer. More specifically, once a desired locking pin hole in the trailer rails has been selected, the driver working alone must guess and move the tractor to slide the trailer until he/she thinks the correct position has been obtained. The driver then has to get out of the tractor to verify that the correct position has been obtained. The aforementioned steps are repeated until the correct position has been acquired. Even with experience driver, most drivers have to make several trips climbing in and out of the tractor before positioning the trailer over the tandems at the selected location. It is not unexpected to take around 20-30 minutes or more for an experience driver to position the trailer in the desired position over the tandems axle.

SUMMARY OF THE INVENTION

Briefly, the present invention comprises a method of positioning a semi-truck trailer over a tandems axle to achieve desired weight distribution and a semi-truck trailer-locking pin locating device. The semi-truck trailer-locking pin locating device comprising an elongated body having a first end, a second end, a first side, and a second side. Located proximal the first end of the elongated body is a crossbar that extends through and is slidably supported by elongated body. The crossbar is preferably positioned perpendicular to the elongated body and includes a roller wheel located at each end of the crossbar. Located proximal the second end of the elongated body is a securing member for securing the second end of the body to a side of a trailer.

The semi-truck trailer locking pin locating apparatus also includes a spring-loaded trip flag located on the second side proximal the second end of the elongated body. The spring-loaded trip flag includes a rod having an indicator flag located at a first end and a coil spring located at an opposing end of the rod with the indicator flag extending beyond the second end of the elongated body. The semi-truck trailer-locking pin locating apparatus also includes a trip flag holder located on the second side of the elongated body for supporting the supporting spring-loaded trip flag in a loaded condition. The semi-truck trailer-locking pin locating apparatus further includes a trigger mechanism located on the second side of the elongated body. The trigger mechanism functions to displace the spring-loaded trip flag in a loaded condition from the trip flag holder when triggered.

The method of positioning a semi-truck trailer over a tandems axle to achieve desired weight distribution includes the steps of aligning a locking pin locating device with a targeted pinhole on a side rail of the semi-truck trailer, securing the locking pin locating device to the semi-truck trailer, setting a spring loaded trip flag of the locking pin locating device to a loaded condition, moving the semi-truck trailer over the tandems axle until the spring loaded trip flag is displaced from the loaded condition, and extending the locking pins of the semi-truck trailer into the pinholes of the side rail to lock the tandem axle to the semi-truck trailer.

BRIEF DESCRIPTION OF THE DRAWINGS

FIG. 3 shows a side view of an embodiment of a locking pin locating device;

FIG. 4 shows a side view of the locking pin locating device of FIG. 3 in a loaded condition;

FIG. 10 shows a side view of an alternative embodiment of a locking pin locating device.

DESCRIPTION OF THE PREFERRED EMBODIMENT

Figure 1:
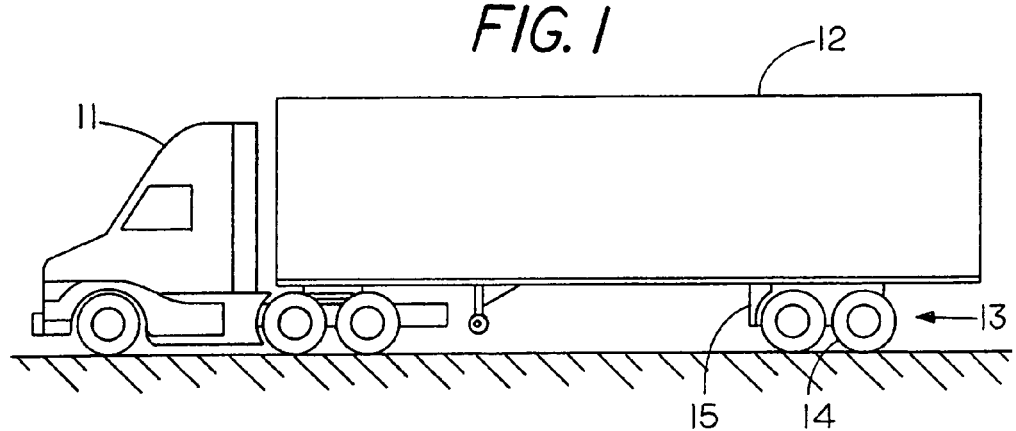
FIG. 1 shows a side view of a typical semi-truck comprising a trailer connected to a tractor.

FIG. 1 shows a side view of a typical semi-truck 10 comprising a tractor 11 connected to a trailer 12. Trailer 12 includes a tandem axle 13 located proximal the rear of the trailer 12 with the tandem axle 13 supporting a set of wheels 14 thereon. Located on the trailer 12 proximal the wheels 14 and between the tractor 11 and the wheels 14 are mud flaps 15. Although not shown, mud flaps 15 are generally supported on trailer 12 by a mud flap bar.

Figure 2:
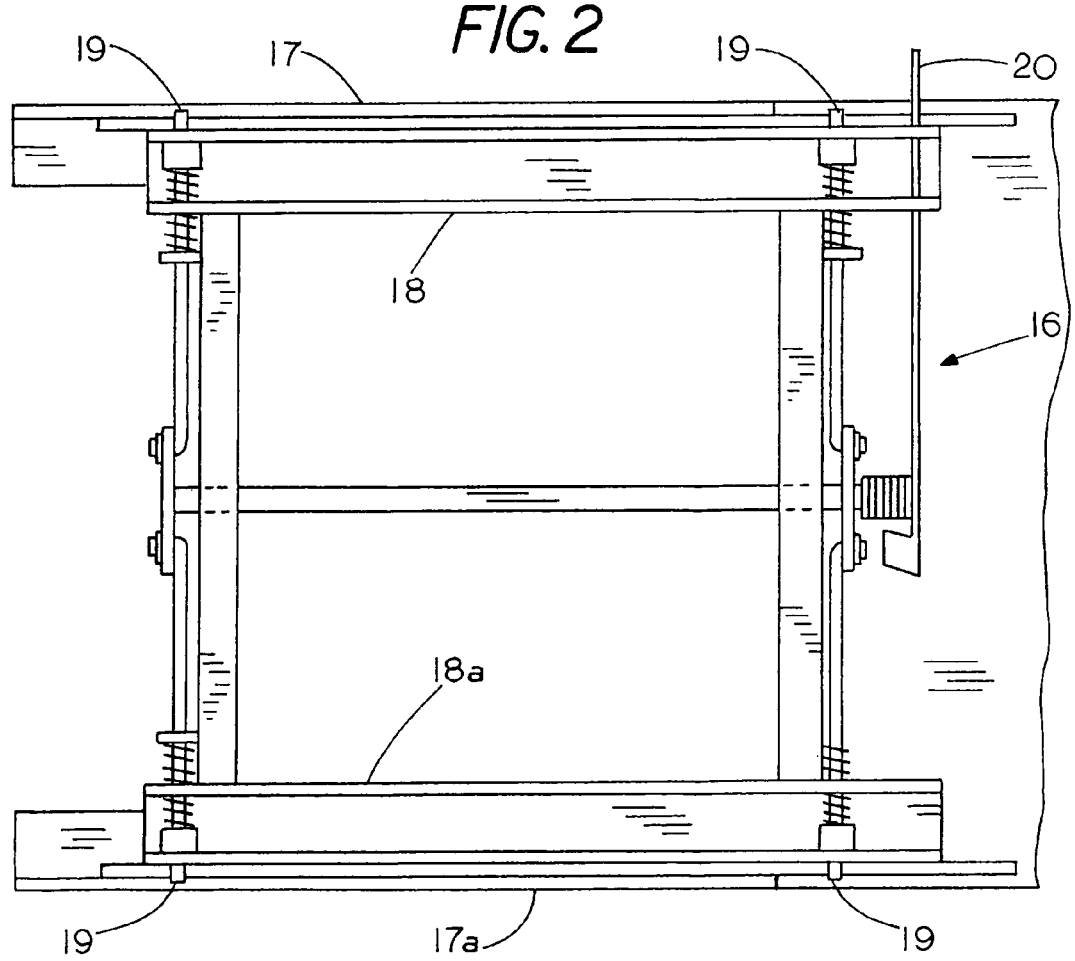
FIG. 2 shows a partial skeletal view of a locking-pin actuating mechanism of a typical trailer for locking the trailer and tandems together.

FIG. 2 shows a partial skeletal view of a locking-pin actuating mechanism 16 on a typical trailer for locking the trailer and tandems together. The trailer comprises two parallel trailer rails 17 and 17a. Although not shown parallel trailer rails 17 and 17a are generally fitted over corresponding tandem axle rails 18, 18a on the tandems. The trailer rails 17 and 17a include a series of pin holes (not shown) positioned to engage extendable locking pins 19 located on the tandems through holes (not shown) in the tandem axle rails 18, 18a. Although the embodiment of FIG. 2 shows the use of four locking pins 19, alternative embodiment also include the employment of two or more pin locking-pin actuating mechanisms to lock the trailer and tandems together.

The locking-pin actuating mechanism 16 is usually located on the tandems and controlled by a locking pin sliding lever 20 wherein the displacement of the locking pin sliding lever 20 simultaneously moves all of the pins. The pin holes in the trailer rails 17, 17a are located so they can correspond to the locations of the pins 19 such that lining up one of the holes on the trailer rail 17 or 17a with a locking pin 19 on one side of the tandems will simultaneously line up a hole on the trailer rail 17 or 17a on the other side of the trailer with a locking pin 19 on the opposing side of the tandems. In use the pins 19 are retracted by the user via the displacement of the sliding lever 20 to permit the trailer to slide back and forth over the tandems and are extended to lock the trailer to the tandems when the proper position is achieved.

Referring to FIGS. 3 and 4, FIG. 3 shows a side view of an embodiment of a locking pin locating device 21 of the present invention and FIG. 4 shows a side view of locking pin locating device 21 in a loaded condition.

Locking pin locating device 21 generally comprises an elongated body 22 having a first end 22a, a second end 22b, a first side 22c, and a second side 22d. Located at or proximal first end 22a is a crossbar 23 (shown in FIGS. 6 and 7) positioned at an angle with respect to a length of body 22. In the embodiment of FIGS. 2 and 4, the crossbar 23 is shown extending perpendicular through a portion of body 22 and is slidably supported by body 22. Crossbar 23 includes roller wheels 24, 24a located at each end of crossbar 23 to assist in the alignment process of locking pin locating device 21. It is noted that alternative embodiments of the locking pin locating device may comprise a crossbar having from no roller wheels to more than 2 roller wheels. A feature of crossbar 23 is that the length of the crossbar 23 may be extended or contracted to correspond to the varying width between the spaced I-beams of a particular trailer.

Locking pin locating device 21 also includes a securing member for securing locking pin locating device 21 to a side of a trailer. In the embodiment of FIGS. 3 and 4, the securing member is shown as comprising a clamp 25 located at or proximal second end 22b of body 22. Securing member may alternatively comprise of other types of securing devices including but not limited to various hooks, vice grips, and straps.

Located on the second side 22d of body 22 is a trip indicator comprising a spring-loaded trip flag 26. Spring-loaded trip flag 26 is shown located proximal the second end 22b of body 22 and includes a rod 27 having a highly visible first end 27a and a resiliently flexible member such as a coil spring 29 located at an opposing end 27b of the rod 27. The highly visible first end 27a includes an indicator flag 28. Coil spring 29 is showing securing spring-loaded trip flag 26 to the body 22 at an angle to the length of the body 22 such that the indicator flag 28 of spring-loaded trip flag 26 extends beyond clamp 25 to enable a user to clearly see trip flag 26.

Also located on body 22 and preferably the second side 22d of body 22 is a trip flag holder 30 for supporting spring-loaded trip flag 26 in a loaded condition as shown in FIG. 4. Body 22 also includes a trigger mechanism 31 that if triggered, such as by a mud flap, mud flap bar, or a trailer wheel, displaces the spring-loaded trip flag 26 from trip flag holder 30. Trigger mechanism 31 is shown in FIGS. 3 and 4 located on the second side 22d of body 22.

Figure 5:
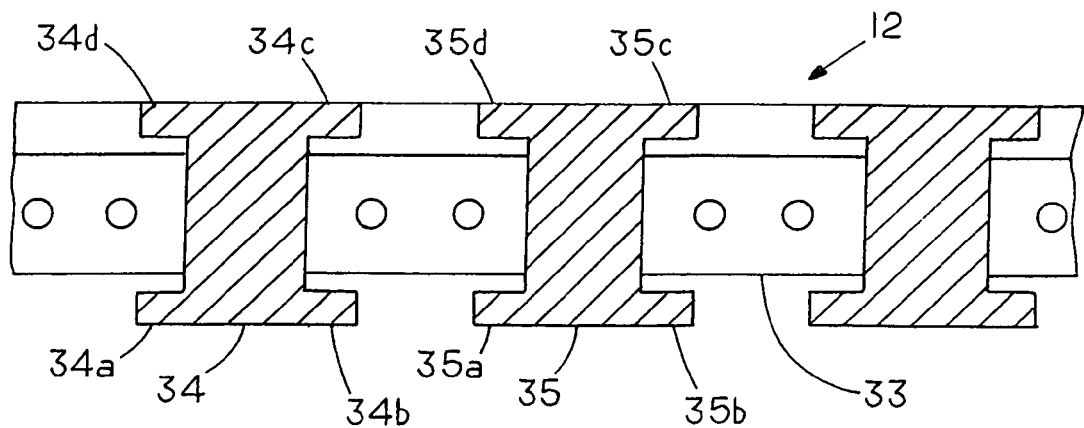
FIG. 5 is a partial cross-sectional side view showing a plurality of evenly spaced I-beams located underneath a trailer.

FIG. 5 is a partial cross-sectional side view of trailer 12 showing a plurality of evenly spaced I-beams 34 located underneath and running perpendicular to the length of trailer 12. Each of the I-beams 34 includes a first lip 34a, a second lip 34b, a third lip 34c, and a fourth lip 34d. As shown in FIG. 5, extending under trailer 12 perpendicular to I-beams 34 is a trailer side rail 33.

Figure 6:
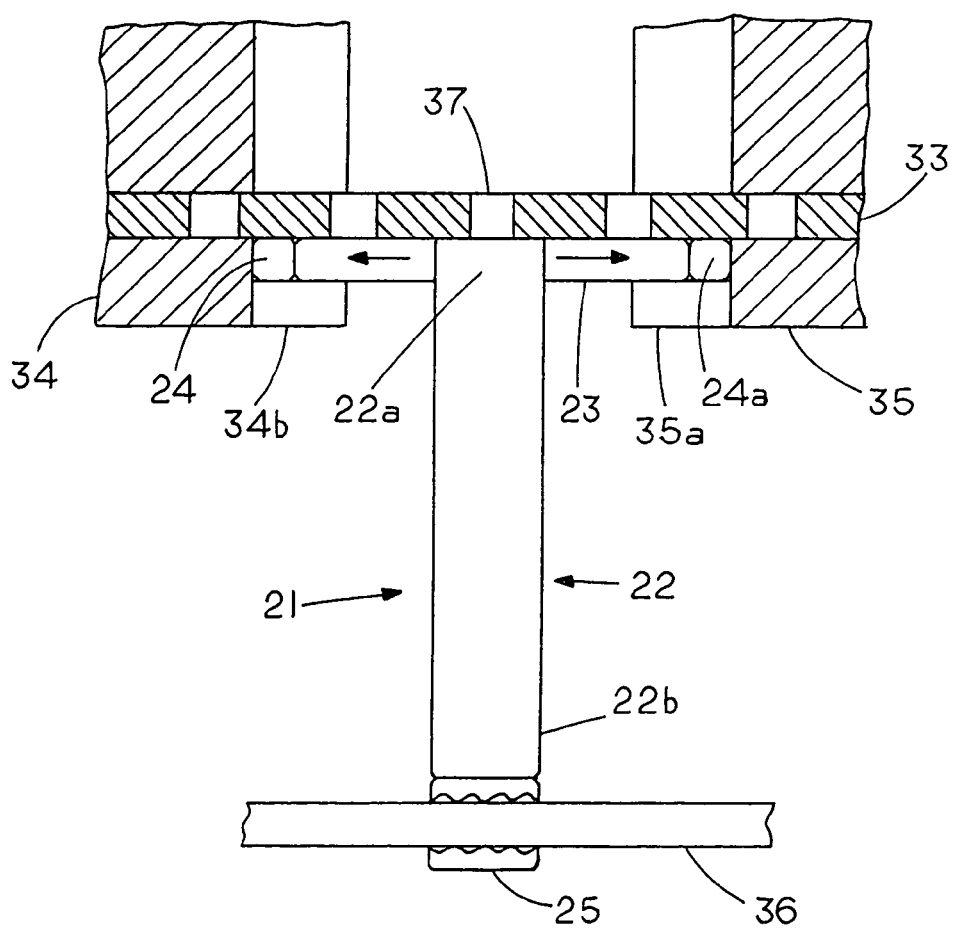
FIG. 6 shows a partial cross-sectional top view of the locking pin locating device of FIGS. 3 and 4 in use underneath a trailer.
Figure 7:
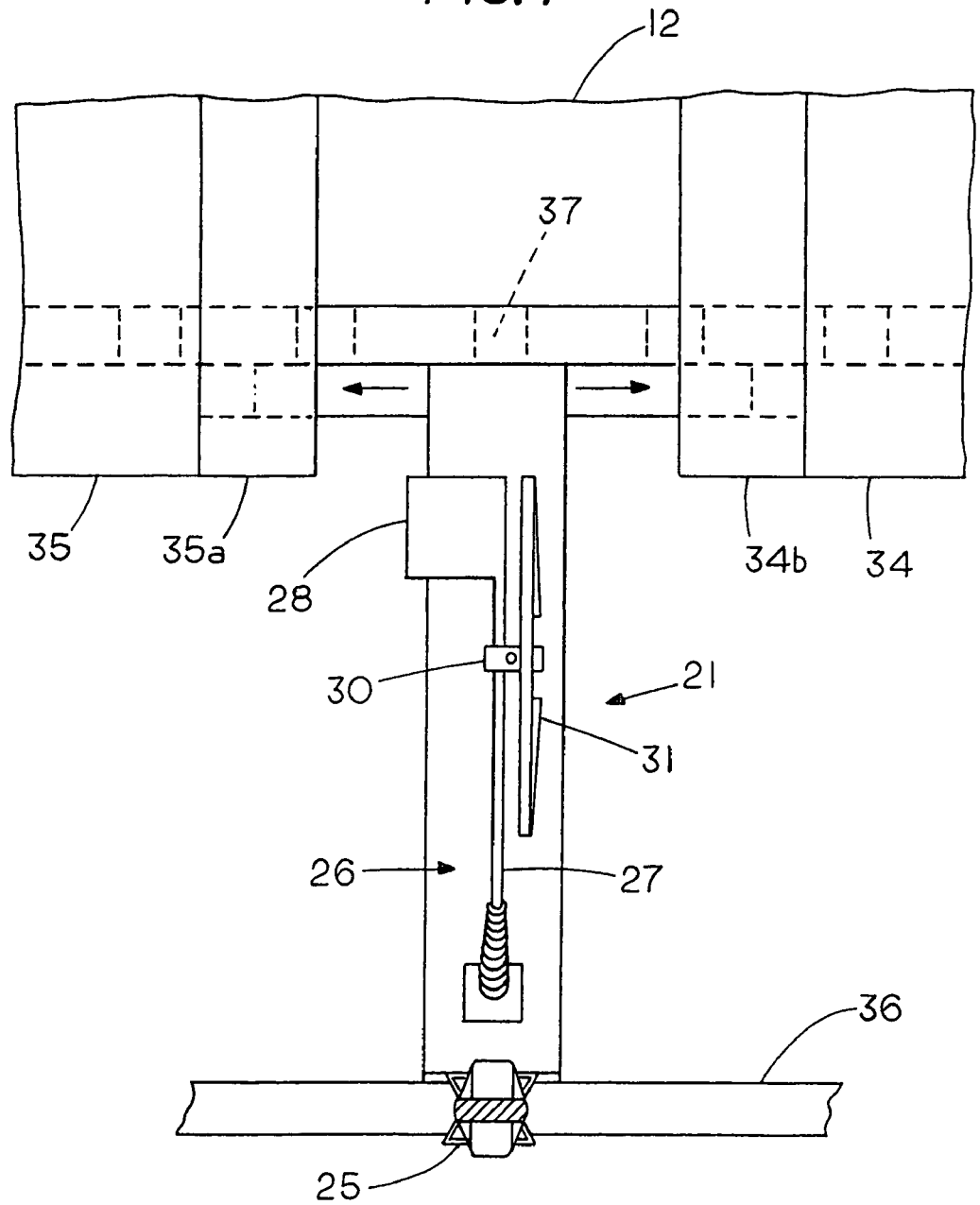
FIG. 7 shows a partial bottom view of the locking pin locating device of FIGS. 3 and 4 in use underneath a trailer.

Referring to FIGS. 6 and 7, FIG. 6 shows a partial cross-sectional top view and FIG. 7 shows a partial bottom view of locking pin locating device 21 in use underneath trailer 12. In the process of preparing locking pin locating device 21 for use, a user first inserts the first end 22a of locking pin locating device 21 underneath the trailer 12 such that roller wheel 24 of locking pin locating device 21 is supported on a second lip 34b of I-beam 34 and roller wheel 24a of locking pin locating device 21 is supported on a first lip 35a of I-beam 35. The user then slidably moves the body 22 of locking pin locating device 21 along crossbar 23 until the length of body 22 is aligned with a targeted pinhole on side rail 33, such as pinhole 37. Once locking pin locating device 21 is aligned with the target pinhole 37 on side rail 33, the user then secures the second end 22b of locking pin locating device 21 to a side 36 of trailer 12 to help maintain locking pin locating device 21 at the desired location.

Referring to FIG. 7, the spring loaded trip flag 26 is then set to the loaded condition by engaging the rod 27 portion of trip flag 26 to the trip flag holder 30. In the embodiment of FIG. 7, it should be noted that in the loaded condition of locking pin locating device 21, the position of the spring loaded trip flag 26 with respect to the trigger mechanism 31 is dependent upon whether the trailer 22 is being moved forward or backwards in positioning of the trailer over the tandem axle. That is, the spring loaded trip flag 26 should be positioned on trip flag holder 30 with respect to the trigger mechanism 31 in a condition such that a triggering element of the trailer 12, such as the trailer wheels 14, mud flap 15 or mud flap supporting bar, engages the trigger mechanism 31 first when the trailer 12 arrives at the desired located.

When contact is made to trigger mechanism 31 by the triggering element of the trailer 12, the trigger mechanism 31 displaces the spring loaded trip flag 26 from the trip flag holder 30 to send the spring loaded trip flag 26 to a normal or unloaded condition as shown in FIG. 3. In the normal or unloaded condition, the flag 28 of the spring loaded trip flag 26 extends sufficiently beyond the side 36 of the trailer 12 to provide the user situated in a cabin of tractor 11 with proper visual indicator that the trailer 12 has arrived at the desire location. In addition, if the user happens to mistakenly move beyond the desired position of the trailer 12, the sight of the flag 28 will also signal to the user to halt further movement of the trailer 12.

Figure 8:
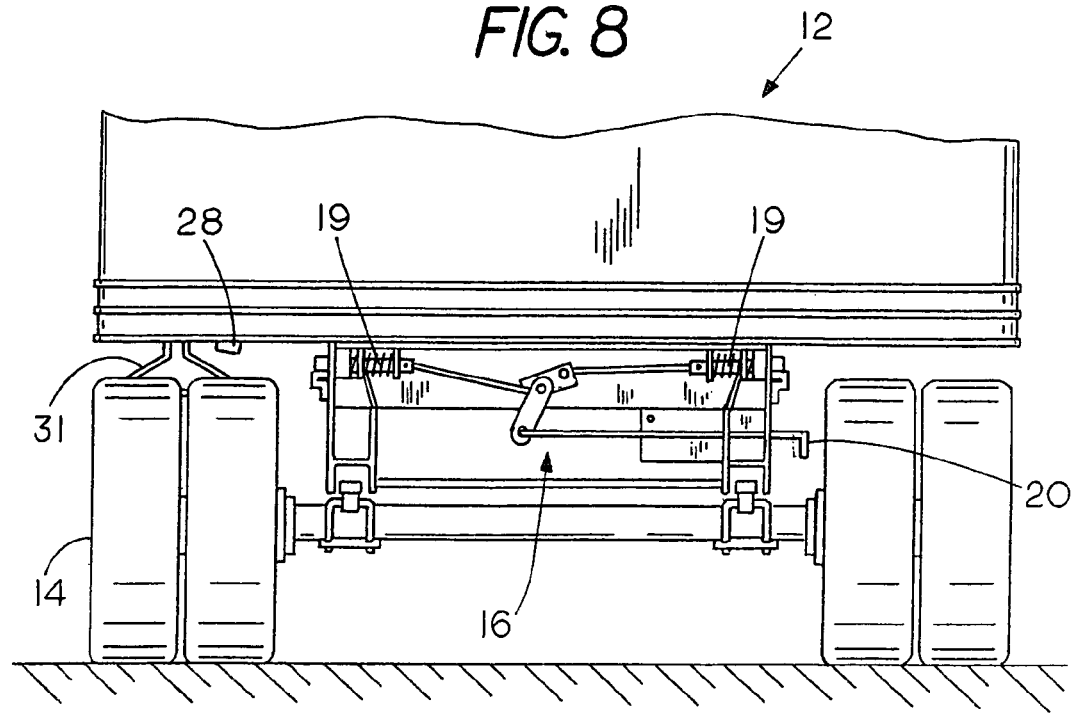
FIG. 8 shows a partial rear view of a trailer with the locking pin actuating mechanism of FIG. 2 maintaining the locking pins in a retracted condition.
Figure 9:
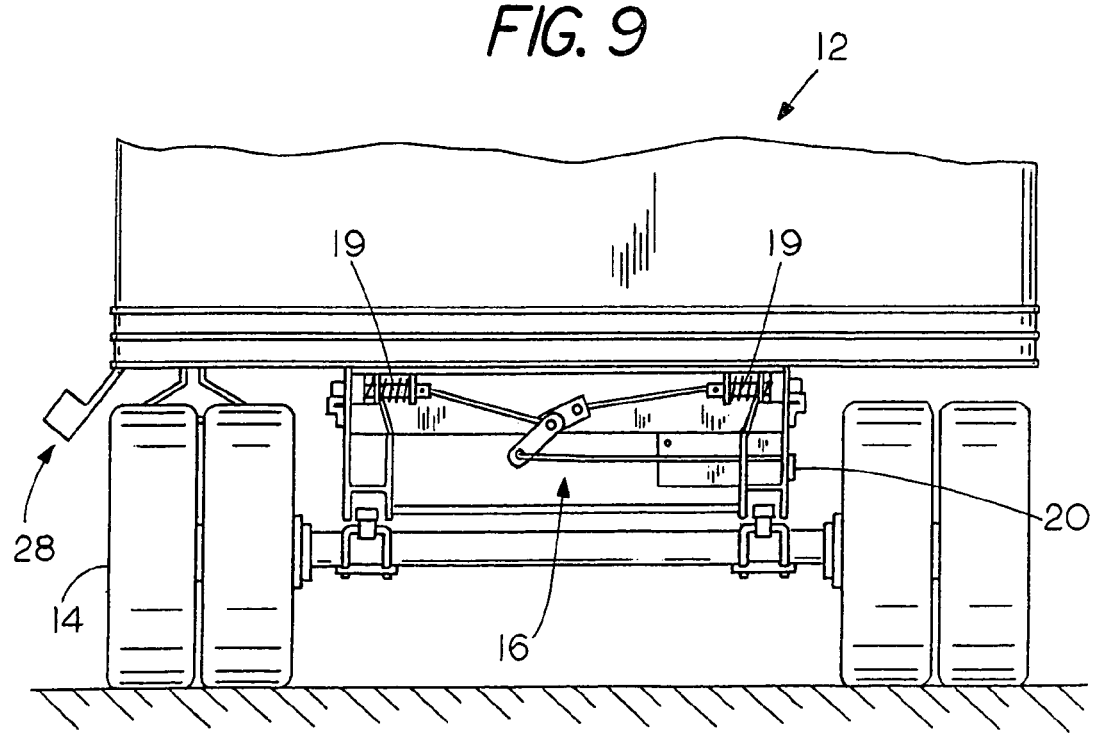
FIG. 9 shows a partial rear view of the trailer arriving at a desire location with the locking pin actuating mechanism maintaining the locking pins in an extended condition.

Referring to FIGS. 8 and 9, FIGS. 8 and 9 each show a partial rear view of the trailer 12 with the locking pin located device 21 in use. FIG. 8 further shows the locking pin actuating mechanism 16 initially maintaining the locking pins 19 in a retracted condition to permit the trailer 12 to slide back and forth over the tandems to a desired location. Referring to FIG. 9, once the desired location is obtained, the wheel 14 makes contact with the trigger mechanism 31 of trip flag 26, which causes the displacement of spring loaded trip flag 26 from the trip flag holder 30. The displacement of spring loaded trip flag from the trip flag holder 30 causes the spring loaded trip flag 26 to return the normal or unloaded condition in which the flag 28 of the spring loaded trip flag 26 extends sufficiently beyond the side 36 of the trailer 12, as shown in FIG. 9, to provide the user in the cabin of tractor 11 with proper visual indicator that the trailer 12 has arrived at the desire location. The user then halts further movement of the trailer 12, gets out of the tractor 11 and activates the locking pin actuating mechanism 16 via the sliding level 20 to extend the locking pins into the pin holes to lock the tandems to the trailer 12.

FIG. 10 shows a side view of an alternative embodiment of a locking pin locating device 38. Locking pin locating device 38 is similar to the locking pin locating device 21 of FIGS. 3 and 4 in that locking pin locating device 38 comprises an elongated body 39 having a first end 39a, a second end 39b, a first side 39c, and a second side 39d.

Locking pin locating device 38 includes a securing member comprising a pliers 40 rotatably connected to the second end 39b of body 39 for securing locking pin locating device 38 to a trailer. Locking pin locating device 38 also includes a Z-bar attachment 41 for use with trailer that have a lift bar or the like on it. Although Z-bar attachment 41 may be attached to locking pin locating device 38 through a variety of means, Z-bar attachment 41 is shown in the embodiment of FIG. 10 attached to locking pin locating device 38 through the use of a set of bolts 41.

The present invention also includes a method of positioning a semi-truck trailer 12 over a tandems axle 13 in a desired location comprising the steps of (1) aligning a locking pin locating device 21 with a targeted pinhole 36 on a side rail 33 of the semi-truck trailer 12; (2) securing the locking pin locating device 21 to the semi-truck trailer 12; (3) setting a spring loaded trip flag 26 of the locking pin locating device 21 to a loaded condition; (4) moving the semi-truck trailer 12 over the tandems axle 13 until the spring loaded trip flag 26 is displaced from the loaded condition; and (5) extending the locking pins 19 of the semi-truck trailer 12 into the pinholes of the side rail 33 to lock the tandem axle 13 to the semi-truck trailer 12.

The above method may also include the steps of (6) engaging a rod portion 27 of trip flag 26 to a trip flag holder 30; (7) inserting a first end 22a of the locking pin locating device 21 underneath the semi-truck trailer 12 so that a first roller wheel 24 of the locking pin locating device 21 is supported on a lip 34b of a trailer I-beam 34 and a second roller wheel 24a of locking pin locating device 26 is supported on a lip 35a of an adjacent trailer I-beam 25; (8) slidably moving a body 22 of the locking pin locating device 21 along a crossbar 23 of the locking pin locating device 21 until a length of the body 22 is aligned with the targeted pinhole 37; and (9) securing a second end 22b of the locking pin locating device 21 to a side 36 of the semi-truck trailer 12.

I claim:

1. A trailer-locking pin locating device comprising:
   an elongated body having a first end and a second end;
   a crossbar located proximal said first end of said elongated body, said crossbar slidably supported by said elongated body and positioned at an angle to a length of said elongated body;
   a securing member for connecting said elongated body to a portion of a semi-trailer;
   a signaling member comprising a rod having a first highly visible end and a second end;
   a resiliently flexible member connecting said second end of said rod to said elongated body with said highly visible end of said rod extending beyond said second end of said elongated body in a normal condition;
   a rod holder for supporting said signaling member in a loaded condition; and
   a trigger mechanism located on said elongated body, said trigger mechanism displacing said signaling member from said loaded condition to said normal condition when triggered.

2. The device of claim 1 wherein said securing member comprises a clamp.

3. The device of claim 1 wherein said securing member comprises a vice grip.

4. The device of claim 1 wherein said length of said crossbar is extendable and contractible.

5. The device of claim 1 wherein said crossbar is positioned perpendicular to a length of said elongated body and extending through said elongated body.

6. The device of claim 1 wherein said crossbar includes a roller wheel located at each end of said crossbar.

7. The device of claim 1 wherein said first highly visible end of said rod includes an indicator flag.

8. The device of claim 1 wherein said resiliently flexible member comprises a coil spring connecting said second end of said rod to said elongated body.

9. The device of claim 1 wherein said signaling member is secured to said elongated body at an angle to a length of said elongated body.

10. The device of claim 1 wherein said signaling member is secured to said elongated body proximal said second end of said elongated body.

11. A semi-truck trailer-locking pin locating device comprising
   an elongated body having a first end, a second end, a first side, and a second side;
   a crossbar located proximal said first end of said elongated body, said crossbar extending through and slidably supported by elongated body, said crossbar positioned perpendicular to said elongated body and includes a roller wheel located at each end of said crossbar;

a securing member located proximal said second end of said elongated body for securing said second end of said body to a side of a trailer;

a spring-loaded trip flag located on said second side proximal said second end of said elongated body, said spring-loaded trip flag including a rod having an indicator flag located at a first end and a coil spring located at an opposing end of said rod, said indicator flag extending beyond said second end of said elongated body;

a trip flag holder located on said second side of said elongated body for supporting said supporting spring-loaded trip flag in a loaded condition; and a trigger mechanism located on said second side of said elongated body, said trigger mechanism displacing said spring-loaded trip flag in a loaded condition from said trip flag holder when triggered.

12. The device of claim 11 wherein said securing member comprises a clamp.

13. The device of claim 11 wherein said length of said crossbar is extendable and contractible.

14. The device of claim 11 wherein said spring-loaded trip flag is secured to said second side of said elongated body by said coil spring.

15. The device of claim 14 wherein said coil spring secures said spring-loaded trip flag to said second side of said elongated body at an angle to a length of the second side.

16. A method of positioning a semi-truck trailer over a tandems axle to achieve desired weight distribution comprising the steps of:

aligning a locking pin locating device with a targeted pinhole on a side rail of said semi-truck trailer;

securing said locking pin locating device to said semi-truck trailer;

setting a spring loaded trip flag of said locking pin locating device to a loaded condition;

moving said semi-truck trailer over said tandems axle until said spring loaded trip flag is displaced from said loaded condition; and extending the locking pins of said semi-truck trailer into said pinholes of said side rail to lock said tandem axle to said semi-truck trailer.

17. The method of claim 16 wherein the step of setting said spring loaded trip flag to a loaded condition comprises engaging a rod portion of trip flag to a trip flag holder.

18. The method of claim 16 wherein including the step of inserting a first end of said locking pin locating device underneath said semi-truck trailer so that a first roller wheel of said locking pin locating device is supported on a lip of a trailer I-beam and a second roller wheel of locking pin locating device is supported on a lip of an adjacent trailer I-beam.

19. The method of claim 16 wherein the step of aligning said locking pin locating device with said targeted pinhole on said side rail of said semi-truck trailer comprises slidably moving a body of said locking pin locating device along a crossbar of said locking pin locating device until a length of said body is aligned with said targeted pinhole.

20. The method of claim 16 wherein the step of securing said locking pin locating device to said semi-truck trailer comprises securing a second end of said locking pin locating device to a side of said semi-truck trailer.

* * * * *